US006985730B2

(12) United States Patent
Hasegawa et al.

(10) Patent No.: US 6,985,730 B2
(45) Date of Patent: Jan. 10, 2006

(54) MOBILE COMMUNICATION CONTROL METHOD AND SYSTEM

(75) Inventors: Toru Hasegawa, Yokosuka (JP); Toyota Nishi, Yokosuka (JP); Takeshi Sugiyama, Yokosuka (JP); Akira Kaiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 562 days.

(21) Appl. No.: 10/211,591

(22) Filed: Aug. 5, 2002

(65) Prior Publication Data
US 2003/0027575 A1 Feb. 6, 2003

(30) Foreign Application Priority Data
Aug. 6, 2001 (JP) .............................. 2001-238089

(51) Int. Cl.
H04Q 7/20 (2006.01)
H04B 1/38 (2006.01)

(52) U.S. Cl. ............................ 455/435.1; 455/432.1; 455/432.3; 455/433; 455/456.3; 455/456.5; 455/560

(58) Field of Classification Search ............ 455/432.1, 455/432.2, 432.3, 433, 434, 435.1, 435.2, 455/456.1, 456.2, 456.3, 422.1, 436, 448, 455/456.5, 456.6, 560, 561; 370/328; 379/221.14, 379/243, 207.02, 201.02, 221.09, 221.1, 379/221.12, 107.02
See application file for complete search history.

(56) References Cited
U.S. PATENT DOCUMENTS
6,205,328 B1 * 3/2001 Lantto et al. ............ 455/414.1
6,341,221 B1 * 1/2002 Huotari ................... 455/414.1
6,363,144 B1 * 3/2002 Becher et al. .......... 379/211.01
6,859,649 B1 * 2/2005 Denenberg et al. ......... 455/406
2001/0005676 A1 * 6/2001 Masuda et al. ............. 455/433
2001/0055379 A1 * 12/2001 Mamiya et al. ........ 379/201.05
2002/0173307 A1 * 11/2002 Salmivalli et al. .......... 455/432

FOREIGN PATENT DOCUMENTS
JP          11-55744        2/1999
JP          11-196453       7/1999
JP          11196453 A  *   7/1999
WO          WO 98/14021     4/1998
WO          WO 01/15465     3/2001

OTHER PUBLICATIONS
ETSI TS 100 974 V7.8.0 (Mar. 2001) Technical Specification, XP-002222512, pp. 836-851, "Digital Cellular Telecommunications System (Phase 2+); Mobile Application Part (MAP) Specification (3GPP TS 09.02 Version 7.8.0 Release 1998)", Jun. 26, 2001.

* cited by examiner

Primary Examiner—William Trost
Assistant Examiner—Meless Zewdu
(74) Attorney, Agent, or Firm—Oblon, Spivak, McClelland, Maier & Neustadt, P.C.

(57) ABSTRACT

A mobile communication control method is provided. In the method, when a home location register receives additional service execution unsupported information from a switch in a network in a roaming destination in response to transferring subscriber information, it is determined whether location registration of a mobile station is to be performed on the basis of at least one item of information on the additional service and activation information of the additional service that are managed by a service control apparatus, and execution of location registration is controlled on the basis of a result of the determination.

7 Claims, 3 Drawing Sheets

MOBILE COMMUNICATION CONTROL METHOD AND SYSTEM

BACKGROUND OF THE INVENTION

1. Field of the Invention

The present invention relates to a mobile communication control method and system. More particularly, the present invention relates to a mobile communication control method and a system for determining whether location registration is to be performed when a mobile station requests location registration in a mobile communication network of a roaming destination, wherein subscriber data for the mobile station is registered in a home location register (HLR).

2. Description of the Related Art

In a mobile communication network, a home location register (HLR) and a service control apparatus (SCF: Service Control Function) are provided, wherein the home location register performs movement management and call origination/incoming management for mobile stations, and the service control apparatus controls additional services. Although the home location register (HLR) and the service control apparatus (SCF) are separated in this embodiment of the present invention, they may be physically integrated as long as the functions are logically separated.

The home location register (HLR) stores subscriber information. The subscriber information includes information for specifying mobile stations that receive a communication service in a mobile communication network (home network) corresponding to the home location register (HLR), information on basic contract communication services (for example, normal communication service) that the mobile stations can receive, and information (which is called trigger information hereinafter) necessary for launching additional services (answering service, for example) controlled by the service control apparatus (SCF). Each time when a service area where a mobile station resides is changed, the new location of the mobile station is registered in the home location register (HLR) based on a request (location registration request) from the mobile station.

At the time of location registration, subscriber data are transferred from the home location register (HLR) to a switch (MSC: Mobile Switch Center or VLR: Visitor Location Register) to which the mobile station is connected. Accordingly, when the switch receives an originating call of a mobile station or an incoming call for the mobile station, the switch performs connection control of the call by using the subscriber data, and provides an additional service for the subscriber by accessing the service control apparatus (SCF) on the basis of trigger information included in the subscriber data.

A roaming service is provided by a contract between the carrier that operates the home network in which subscriber data of the mobile station are registered and another carrier that operates another mobile communication network. By using the roaming service, a mobile station whose subscriber data are registered in a home location register in a mobile communication network can receive a communication service in another mobile communication network. In such roaming service, when a mobile station sends a location registration request to a switch in the other mobile communication network of a roaming destination, the location registration request is transferred from the switch to which the mobile station is connected to the home location register (HLR). Then, the home location register (HLR) that receives the location registration request sends subscriber data of the mobile station to the switch to which the mobile station is connected.

When the switch has a function for executing an additional service by accessing the service control apparatus (SCF) of the home network by using the trigger information, the switch that receives the subscriber data sends an acknowledgment for receiving the subscriber data to the home location register (HLR) of the home network. The home location register (HLR) that receives the acknowledgement of the subscriber data from a switch of another mobile communication network performs location registration of the mobile station that sends the location registration request. Accordingly, the mobile station connected to the switch of another mobile communication network can receive communication services including additional services controlled by the service control apparatus (SCF) of the home network.

On the other hand, when the switch of the other mobile network does not have the function for executing additional services by accessing the service control apparatus (SCF) of the home network, the switch transfers information (execution function unsupported response) to the home location register (HLR), wherein the information (execution function unsupported response) indicates that the switch does not have the function for executing the additional services. The home location register (HRL) that receives the execution function unsupported response sends a response of rejecting location registration to the switch in response to the location registration request from the switch. This response for rejecting the location registration is transferred to a mobile station connected to the switch, so that the mobile station cannot receive a communication service in the other mobile communication network.

The home location register (HLR) that receives the execution function unsupported response may send a response for accepting location registration to the switch and perform the location registration in response to the location registration request from the mobile station. In this case, the mobile station connected to the other mobile communication network cannot receive the additional service, but can receive the basic contract communication service while the mobile station resides in the other mobile communication network.

In addition, the home location register (HLR) that receives the execution unsupported response may send a response for accepting location registration and service information of call origination restriction to the switch as subscriber information, and performs location registration. In this case, the mobile station connected to the other mobile communication network can receive a communication service only for incoming calls.

As mentioned above, according to the conventional mobile communication control method based on a location registration request sent from the mobile station in the other mobile communication network, when the switch does not have the function for executing additional services by accessing the service control apparatus (SCF) of the home network, the switch rejects or accepts location registration, or accepts location registration only for a call origination restriction service, uniformly, irrespective of details and status of additional services that the subscriber subscribes to. Therefore, control of accept/reject for location registration cannot be performed for each subscriber based on details and status (activated and inactivated) of additional services to which the subscriber subscribes.

SUMMARY OF THE INVENTION

An object of the present invention is to provide a mobile communication control method for controlling accept/reject of location registration individually for each mobile station according to details and status of additional services registered in the service control apparatus when a location registration request is sent from a mobile communication network of a roaming destination.

The above-mentioned object can be achieved by a mobile communication control method used for determining whether location registration is to be performed when a home location register receives a location registration request sent from a mobile station via a switch in a mobile communication network of a roaming destination, the method comprising the steps of:

when the home location register receives information, from the switch, indicating that the switch does not have a function for executing an additional service by accessing a service control apparatus, determining whether location registration of the mobile station is to be performed on the basis of at least one item of information on the additional service and activation information of the additional service that are managed by the service control apparatus; and controlling execution of location registration on the basis of the result of the step of determining.

According to this mobile communication control method, after the home location register receives a location registration request from the switch in a network of a roaming destination, when the home location register receives information, from the switch, indicating that the switch does not have a function for executing an additional service in response to transferring subscriber information, it is determined whether location registration of the mobile station is to be performed on the basis of at least one item of information on the additional service and activation information of the additional service that are managed by the service control apparatus, and location registration control for the mobile station is performed according to the result of the determination. The activation information indicates an activated status indicating that the additional service is effective or an inactivated status indicating that the additional service is ineffective.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention will be described with reference to figures.

Figure 1:
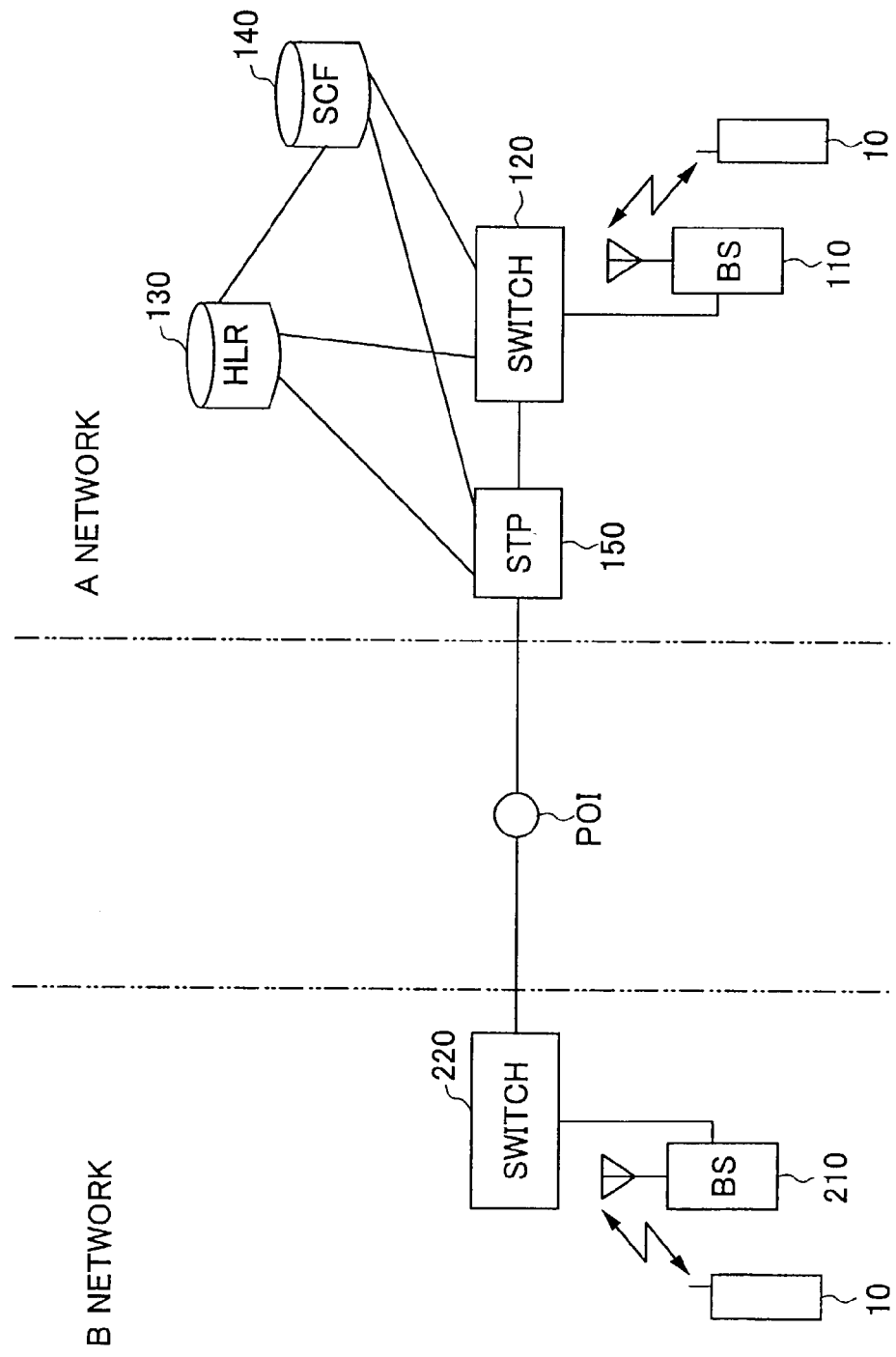
FIG. 1 shows an example of a system to which the mobile communication control method of an embodiment of the present invention is applied.

FIG. 1 shows an example of a system to which the mobile communication control method of an embodiment of the present invention is applied.

In FIG. 1, a mobile communication network A (which will be called A network hereinafter) includes a base station 110, a switch 120, a home location register (HLR) 130, a service control apparatus (SCF) 140 and an STP (Signaling Transfer Point). A mobile station 10 communicates with the base station 110 by radio, and the mobile station 10 can communicate (voice communication, data communication) with other communication terminals via the switch 120 connected to the base station 110. The home network for the mobile station 10 is the A network.

The home location register 130 stores subscriber information including information (telephone number, contract number, IMUI and the like) for specifying the mobile station 10, information on a basic contract communication service (normal telephone service, for example) that the mobile station can receive, and trigger information necessary for executing an additional service (answering service, for example) controlled by the service control apparatus 140. The home location register 130 also performs location registration of the mobile station 10.

The service control apparatus 140 manages information on additional services to which the subscriber subscribes. When an answering service and a call transferring service are subscribed to as the additional services, the following information is managed by the service control apparatus 140: answering service contract information, answering service activation information (activated status, inactivated status), answering phone calling time, message storing connection number of answering phone, call transfer service contract information, call transfer service activation status (activated status or inactivated status), call transfer calling time, call transfer destination number. Control for additional services is performed on the basis of theses items of information.

When a call origination restriction service and communication service within a charge amount are subscribed to as additional services, the following items of information are managed by the service control apparatus 140, for example: call origination restriction service contract information, call origination restriction service activation information (activated status or inactivated status), call origination restriction terms, contract information of communication service within a charge amount, activation information of communication service within a charge amount (activated status or inactivated status), cumulative total of charges of telephone calls.

The switch 120 performs connection control of a call for the mobile station 10 on the basis of the subscriber information, which is downloaded from the home location register 130 at the time of location registration request by the mobile station 10. In addition, the switch 120 accesses the service control apparatus 140 on the basis of trigger information included in the subscriber information, and performs the additional service by using the information on the additional services to which the user subscribes. Accordingly, the mobile station 10 can receive communication services that include additional services in the A network.

The STP 150 has a function of distributing input signals to each apparatus (home location register 130, service control apparatus 140, and switch 120 and the like).

The A network and another mobile communication network B (which will be called B network hereinafter) that is operated by a carrier different from the carrier of the A network are connected via a POI (point of interface), so that the mobile station 10 can receive a communication service in the B network (roaming). As a result, a switch 220 in the B network can communicate with the home location register 130 via the POI, the STP 150 of the A network and the switch 120, or via the POI and the STP 150.

Figure 2:
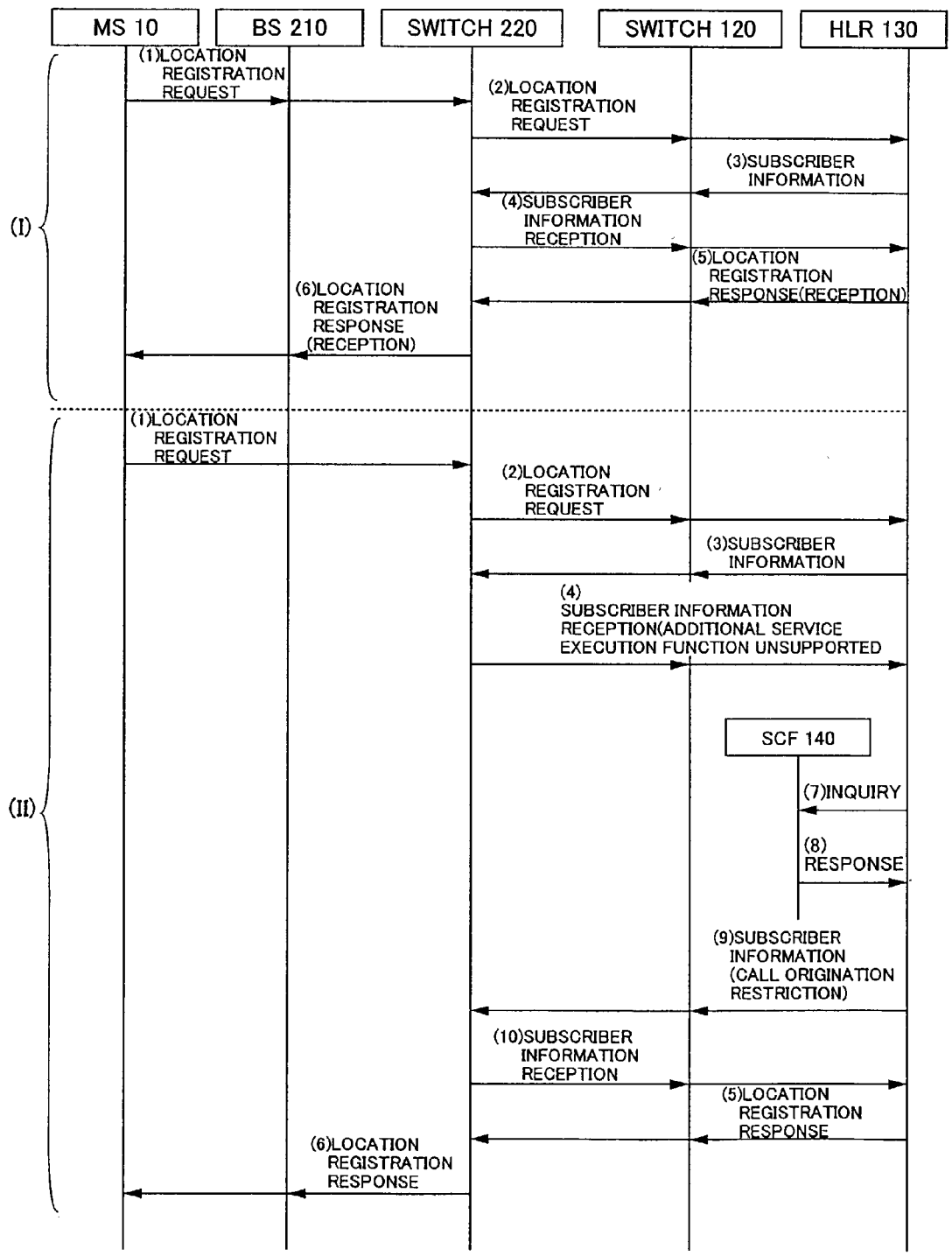
FIG. 2 shows an example of a procedure for location registration in the system shown in FIG. 1.

When the mobile station 10 transfers a location registration request to the switch 220 via the base station 210 in the B network, location registration for the mobile station 10 is performed according to a procedure shown in FIG. 2, for example, wherein subscriber information of the mobile station 10 is registered in the home location register 130. At the time of location registration, the home location register 130 performs processes according to a procedure shown in FIG. 3, for example.

In a procedure of (I) shown in FIG. 2, when a location registration request is sent from the mobile station 10, the location registration request is transferred to the switch 220 via the base station 210 (1). The switch 220 sends the location registration request to the home location register 130 (2). Then, the location registration request is transferred to the home location register 130 via the POI, the STP 150 of the A network, and the switch 120. The STP 150 is not shown in FIG. 2. When the home location register 130 receives the location registration request (S1 in FIG. 3), the home location register 130 sends subscriber information corresponding to the mobile station 10 (3) (S2 in FIG. 3).

The subscriber information sent from the home location register 130 is transferred to the switch 220 in B network via the switch 120. When the switch 220 has a function for executing additional services managed by the service control apparatus 140 by accessing the service control apparatus 140 by using trigger information included in subscriber information, the switch 220 sends a subscriber information reception response to the home location register 130 (4).

Figure 3:
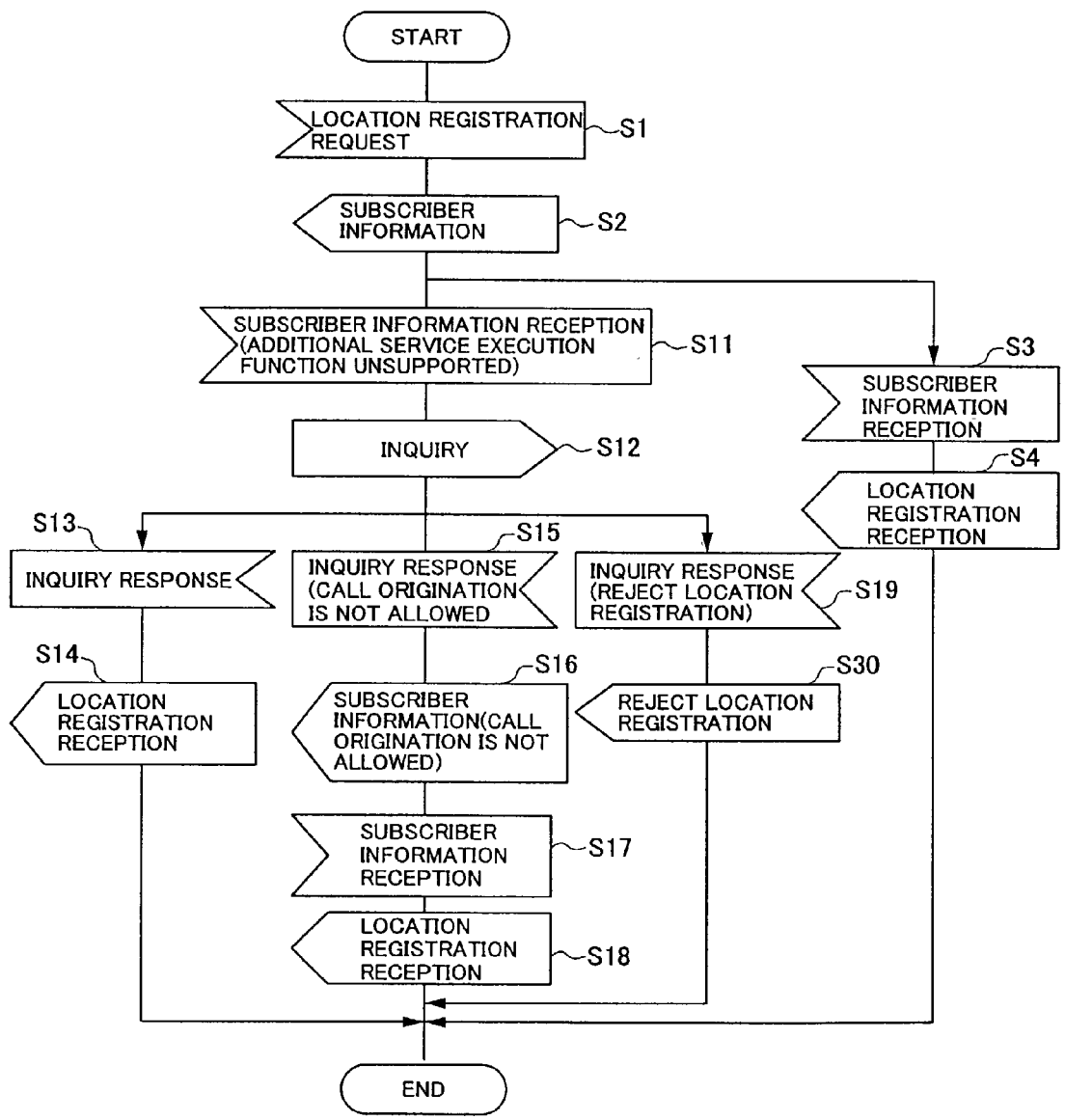
FIG. 3 shows a flowchart indicating an example of a procedure performed by the home location register at the time of location registration according to the present invention.

When the home location register 130 receives the subscriber information reception response from the switch 220 of the B network (S3 in FIG. 3), the home location register 130 performs location registration of the mobile station 10 (S4 in FIG. 3). Then, the home location register 130 sends a location registration response to the switch 220 in B network via the switch 120 (5), the location registration response indicating that the home location register 130 accepts the location registration request. The location registration response is transferred to the mobile station 10 via the base station 210 (6). Accordingly, the mobile station 10 can receive communication services based on the subscriber information and additional services the subscriber subscribes to via the base station 210 and the switch 220, wherein the additional services are controlled by the service control apparatus 140.

In a procedure shown in (II) in FIG. 2, when a location registration request sent from the mobile station 10 is received by the switch 220 in the same way as the procedure of (I), the switch 220 sends the location registration request to the home location register 130 of the A network (1, 2). The home location register 130 that receives the location registration request sends subscriber information corresponding to the mobile station 10 to the switch 220 in the B network (3) (S1, S2 in FIG. 3).

The subscriber information sent from the home location register 130 is transferred to the switch 220 via the switch 120. When the switch 220 does not have a function for executing additional services by accessing the service control apparatus 140 in A network, the switch 220 sends information (additional service execution function unsupported) indicating that it does not have the function for executing additional services and a subscriber information reception response to the home location register 130 (4).

When the home location register 130 receives the information of additional service execution function unsupported and the subscriber information reception response (S11 in FIG. 3), the home location register 130 inquires about acceptability of location registration for the mobile station 10 to the service control apparatus 140 (7) (S12 in FIG. 3). The service control apparatus 140 that receives the inquiry determines whether location registration of the mobile station 10 is to be performed according to details and status (activated status, inactivated status) of additional services the subscriber subscribes to.

For example, when an additional service (answering service, call transfer service or the like) is in an inactivated status, the additional service cannot be provided to the subscriber. Thus, the service control apparatus 140 returns information indicating that location registration is allowed to the home location register 130 in response to the inquiry (8). When the home location register 130 receives the response (S13 in FIG. 3), the home location register 130 performs location registration for the mobile station 10 (S14 in FIG. 3).

Then, the home location register 130 transfers a location registration response indicating that it receives the location registration request to the switch 220 via the switch 120 (5). The location registration response is transferred to the mobile station 10 via the base station 210 (6). Accordingly, the mobile station 10 can receive the basic contract communication service on the basis of the subscriber information via the base station 210 and the switch 220.

When the additional service for the subscriber is a call origination restriction service and the service is in an activated status, in response to the inquiry from the home location register 130, the service control apparatus 140 returns, to the home location register 130, call origination restriction service contract information, information on call origination restriction terms and information indicating that location registration is allowed (8). When the home location register 130 receives the response (S15 in FIG. 3), the home location register 130 sends the call origination restriction information and the information on call origination restriction terms to the switch 220 in B network (9) (S16 in FIG. 3).

When the switch 220 receives the call origination restriction information and the information on call origination restriction terms from the home location register 130 as subscriber information, the switch 220 sends a subscriber information reception response to the home location register 130 (10). When the home location register 130 receives the subscriber information reception response (S17 in FIG. 3), the home location register 130 performs location registration of the mobile station 10 (S18 in FIG. 3). Then, the home location register 130 sends a location registration response indicating that it receives the location registration request to the switch 220 in B network via the switch 120 (5). The location registration response is transferred to the mobile station 10 via the base station 210 (6).

Accordingly, the mobile station 10 can receive the call origination restriction service on the basis of the call origination restriction contract information and information on call origination restriction terms via the base station 210 and the switch 220. As a result, the mobile station 10 can receive a communication service (only incoming calls, for example) on the basis of subscriber information while call restriction is applied.

In addition, the service control apparatus 140 may return information (8) indicating that it rejects location registration to the home location register 130 in response to the inquiry from the home location register according to information on the additional service for the subscriber. For example, when cumulative charges for a communication service within a charge amount exceed a predetermined amount, location registration is rejected. The home location register 130 that receives the response (S19 in FIG. 3) transfers location registration response indicating that it rejects location registration to the switch 220 in B network via the switch 120 (5) (S20 in FIG. 3). The location registration response is transferred to the mobile station 10 via the base station 210 (6). Accordingly, the mobile station 10 cannot receive a communication service via the base station 210 and the switch 220.

As mentioned above, when the switch 220 in the B network receives a location registration request sent from the mobile station 10 and the switch 220 does not have a function for executing an additional service by accessing the service control apparatus 140 in A network, the service control apparatus 140 determines whether to accept or reject location registration, or conditionally (for example, call origination restriction) accept location registration according to details and status of additional services for the subscriber, in response to the inquiry from the home location register 130. Then, location registration for the mobile station 10 is controlled according to the result of determination. Accordingly, individual control of location registration for each mobile station becomes available according to details and status of additional services.

In the above-mentioned example, although the service control apparatus 140 determines availability of location registration of the mobile station 10 on the basis of details and status of additional services, the method of control is not limited to this. For example, the home location register 130 may obtain information and status of additional services from the service control apparatus 140, and determine availability of location registration of the mobile station 10. In addition, an apparatus-other than the home location register 130 and the service control apparatus 140 may obtain information and status of the additional services from the service control apparatus 140, determine availability of location registration of the mobile station 10 and send results to the home location register 130.

In addition, in the embodiment, although the switch 220 in B network communicates with the home location register 130 of the A network via the STP 150 and the switch 120, the switch 220 may communicate with the home location register 130 only via the STP 150.

As mentioned above, according to the present invention, when the home location register 130 receives information, from the switch in a network of a roaming destination, indicating that the switch does not have a function for executing an additional service by accessing a service control apparatus in response to receiving subscriber information, it is determined whether location registration of the mobile station is to be performed on the basis of at least one item of information on the additional service and activation information of the additional service that are managed by the service control apparatus 140. As a result, when a location registration request is sent from a mobile communication network of a roaming destination, acceptability of location registration can be controlled individually for each subscriber according to details and status of additional services recorded in the service control apparatus 140.

In addition, when the activation information indicates that the additional service is in an inactivated status, it can be determined that location registration of the mobile station is accepted. In addition, when the activation information indicates that the additional service is in an activated status, it can be determined that location registration of the mobile station is rejected.

Further, when the additional service is a call origination service and the activation information indicates that the call origination service is in an activated status, location registration of the mobile station can be accepted on condition that call origination is restricted. In this case, the location of the mobile station can be registered in the home location register and information on the call restriction service can be sent to the switch 220 as subscriber information.

The apparatus for performing determination of acceptability of location registration is not limited. From the viewpoint that the home location register 130 and the service control apparatus 140 can perform the determination, the mobile communication control method of the present invention may includes the steps of: sending an inquiry from the home location register 130 to the service control apparatus 140 when the home location register 130 receives, from the switch 220, information indicating that the switch 220 does not have the function; and the service control apparatus 140 that receives the inquiry determining whether location registration of the mobile station is accepted on the basis of at least one item of information on the additional service and activation information of the additional service.

The present invention is not limited to the specifically disclosed embodiments, and variations and modifications may be made without departing from the scope of the invention.

What is claimed is:

1. A mobile communication control method used for determining whether location registration is to be performed when a home location register receives a location registration request sent from a mobile station via a switch in a mobile communication network of a roaming destination, said method comprising the steps of:

when said home location register receives information, from said switch, indicating that said switch does not have a function for executing an additional service by accessing a service control apparatus, determining whether location registration of said mobile station is to be performed on the basis of at least one item of information on said additional service and activation information of said additional service that are managed by said service control apparatus; and controlling execution of location registration on the basis of a result of the step of determining, wherein the step of determining includes a step of rejecting location registration of said mobile station when said activation information indicates that said additional service is in an activated status.

2. The mobile communication control method as claimed in claim 1, the step of determining including a step of accepting location registration of said mobile station when said activation information indicates that said additional service is in an inactivated status.

3. The mobile communication control method as claimed in claim 1, the step of determining including a step of accepting location registration of said mobile station on condition that call origination is restricted when said additional service is a call origination service and said activation information indicates that said call origination service is in an activated status.

4. The mobile communication control method as claimed in claim 3,
the step of controlling including a step of registering a location of said mobile station in said home location register and sending information on said call restriction service to said switch as subscriber information.

5. A mobile communication control system for determining whether location registration is to be performed when a home location register receives a location registration request sent from a mobile station via a switch in a mobile communication network of a roaming destination, said system comprising:
a part for determining, when said home location register receives information from said switch indicating that said switch does not have a function for executing an additional service by accessing a service control apparatus, whether location registration of said mobile station is to be performed on the basis of at least one item of information on said additional service and activation information of said additional service that are managed by said service control apparatus; and
a part for controlling execution of location registration on the basis of a result obtained by the part of determining,
wherein the part for determining is configured to reject location registration of said mobile station when said activation information indicates that said additional service is in an activated status.

6. A home location register in a mobile communication control system for determining whether location registration is to be performed when said home-location register receives a location registration request sent from a mobile station via a switch in a mobile communication network of a roaming destination, said home location register comprising:
a part for, when said home location register receives information from said switch indicating that said switch does not have a function for executing an additional service by accessing a service control apparatus, determining whether location registration of said mobile station is to be performed on the basis of at least one item of information on said additional service and activation information of said additional service that are managed by said service control apparatus; and
a part for controlling execution of location registration on the basis of said determination
wherein the part for determining determines to reject location registration of said mobile station when said activation information indicates that said additional service is in an activated status.

7. A service control apparatus in a mobile communication control system for determining whether location registration is to be performed when a home location register receives a location registration request sent from a mobile station via a switch in a mobile communication network of a roaming destination, said service control apparatus comprising:
a part for receiving an inquiry sent from said home location register when said home location register receives information from said switch indicating that said switch does not have a function for executing an additional service by accessing said service control apparatus; and
a part for determining whether location registration of said mobile station is to be performed on the basis of at least one item of information on said additional service and activation information of said additional service that are managed by said service control apparatus,
wherein the part for determining is configured to reject location registration of said mobile station when said activation information indicates that said additional service is in an activated status.

* * * * *